United States Patent
Vrieze et al.

(10) Patent No.: US 7,007,632 B1
(45) Date of Patent: Mar. 7, 2006

(54) MILKING PARLOR STALL SHOULDER BUMPER

(75) Inventors: Josh J. Vrieze, Baldwin, WI (US); Joseph G. Prazak, Sun Prairie, WI (US)

(73) Assignee: Bou-Matic Technologies Corporation, Madison, WI (US)

(*) Notice: Subject to any disclaimer, the term of this patent is extended or adjusted under 35 U.S.C. 154(b) by 0 days.

(21) Appl. No.: 10/758,921

(22) Filed: Jan. 16, 2004

(51) Int. Cl.
*A01J 5/00* (2006.01)

(52) U.S. Cl. .................... 119/14.03; 247/140
(58) Field of Classification Search ............ 119/14.03, 119/516, 520, 524; 482/131; 267/140
See application file for complete search history.

(56) References Cited

U.S. PATENT DOCUMENTS

| | | | |
|---|---|---|---|
| 1,770,450 A * | 7/1930 | Bahr | 119/423 |
| 3,183,890 A * | 5/1965 | Albers | 119/667 |
| 3,197,189 A * | 7/1965 | Pemper et al. | 267/140 |
| 3,608,882 A * | 9/1971 | Culp | 267/140 |
| 3,950,953 A * | 4/1976 | Matthews | 405/215 |
| 5,000,119 A * | 3/1991 | Moreau et al. | 119/14.03 |
| 5,203,280 A | 4/1993 | Nelson | |
| 5,259,335 A * | 11/1993 | Moreau | 119/14.03 |
| 5,441,016 A * | 8/1995 | Ricketts | 119/723 |
| 5,803,015 A * | 9/1998 | Rhodes et al. | 119/14.02 |
| 5,970,911 A * | 10/1999 | van der Lely | 119/14.03 |
| 5,988,609 A * | 11/1999 | Young | 267/140 |
| 6,432,029 B1 * | 8/2002 | Almeda | 482/140 |
| 6,481,371 B1 | 11/2002 | Eppers et al. | |

* cited by examiner

*Primary Examiner*—Teri Pham Luu
*Assistant Examiner*—Susan C. Alimenti
(74) *Attorney, Agent, or Firm*—Andrus, Sceales, Starke & Sawall, LLP

(57) ABSTRACT

A milking parlor is provided with stalls having shoulder bars guidingly locating the shoulders of the cows in a milking position, with the bars having respective resilient bumpers engaging the shoulders in deformable cushioning relation.

4 Claims, 7 Drawing Sheets

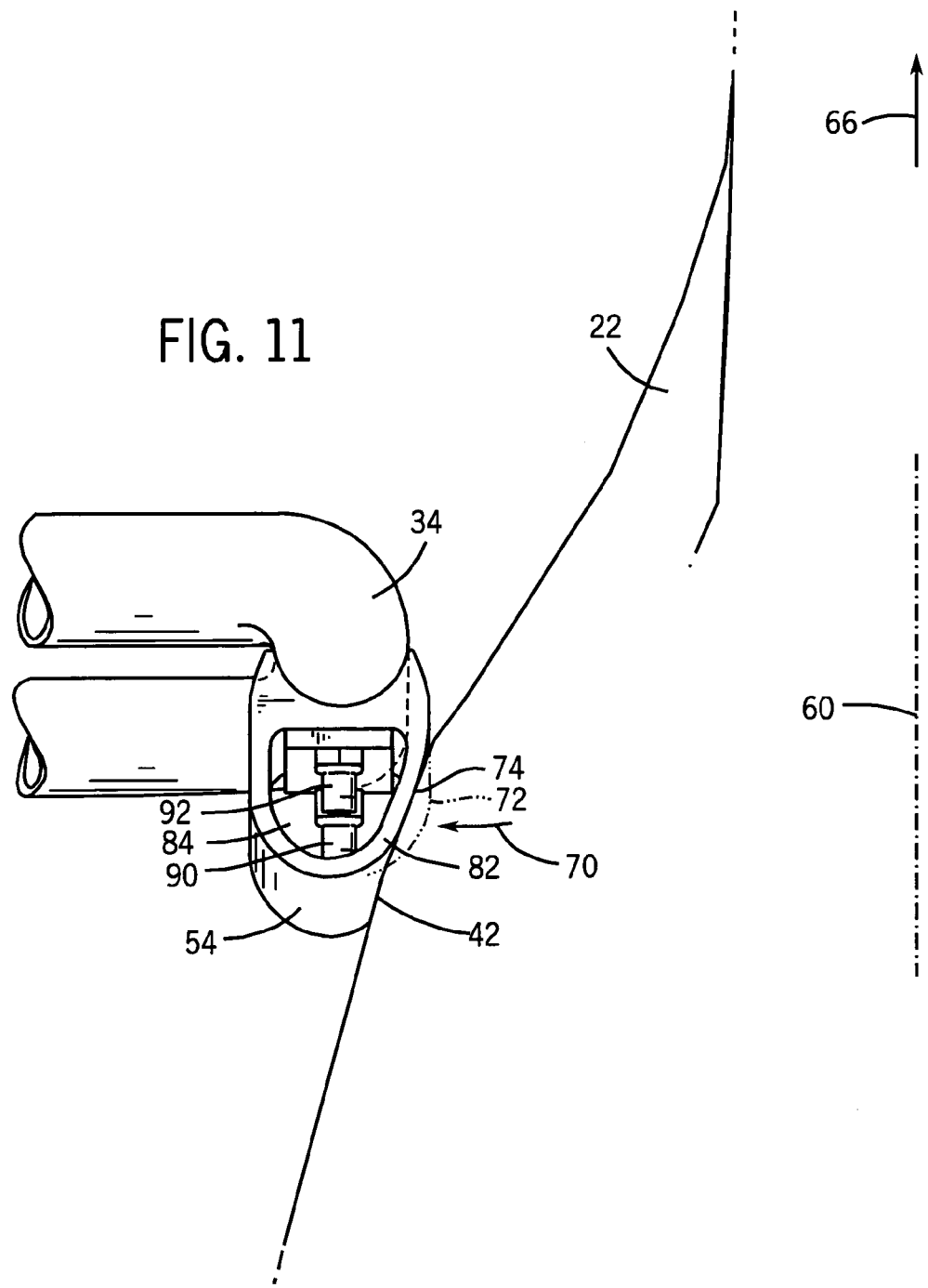

MILKING PARLOR STALL SHOULDER BUMPER

BACKGROUND AND SUMMARY

The invention relates to milking parlors having a plurality of milking stalls for milking mammals such as cows.

A milking parlor stall typically has a pair of shoulder bars guidingly locating the shoulders of the cow in a milking position. The bars can engage the cow's shoulders at bony areas having nerves, which is a source of discomfort for the cow. Cows have been observed with sore spots in the shoulders where there is no fur left. The present invention addresses and solves this problem, and additionally provides a further benefit of accommodating different size cows.

BRIEF DESCRIPTION OF THE DRAWINGS

FIG. 11 is an enlarged top elevation view of a portion of FIG. 6.

DETAILED DESCRIPTION OF THE INVENTION

Figure 1:
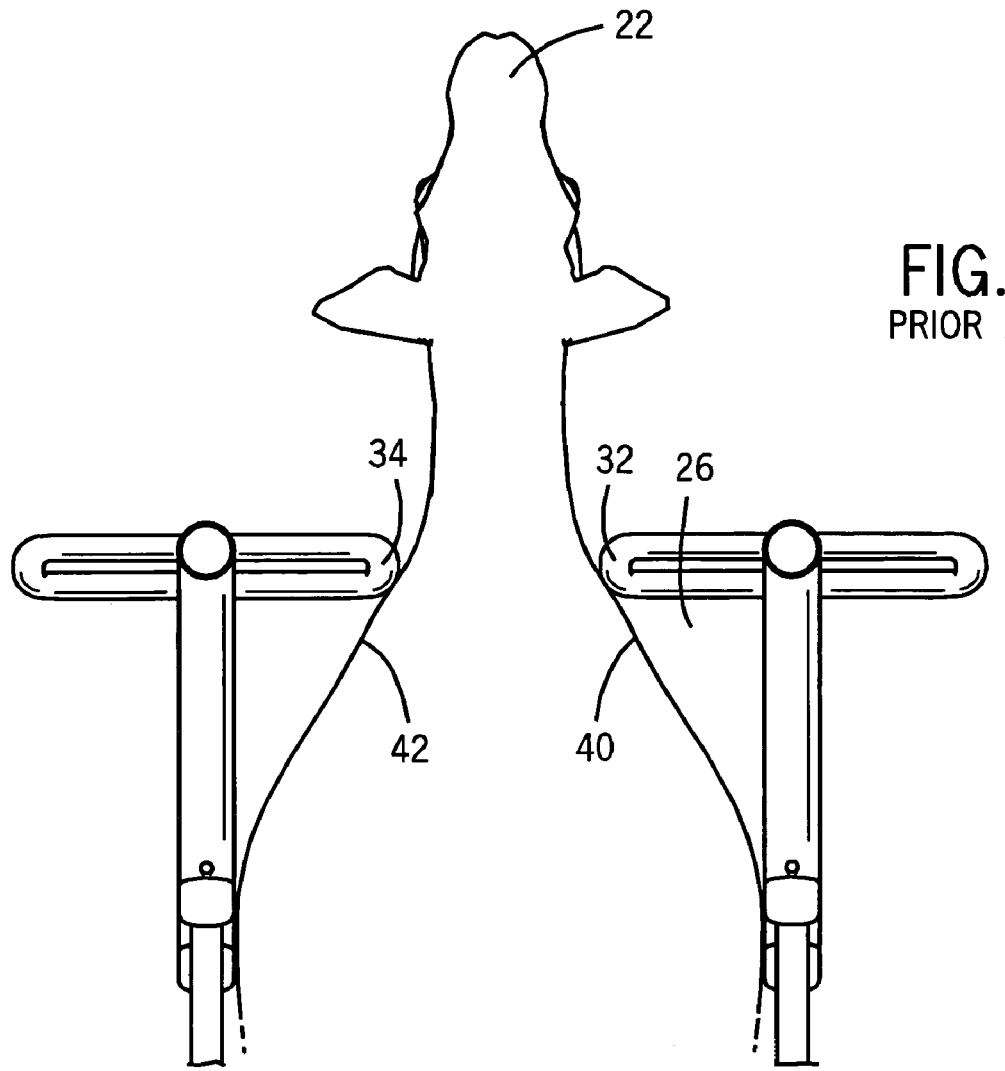
FIG. 1 is a top elevation view of a milking parlor stall known in the prior art.
Figure 2:
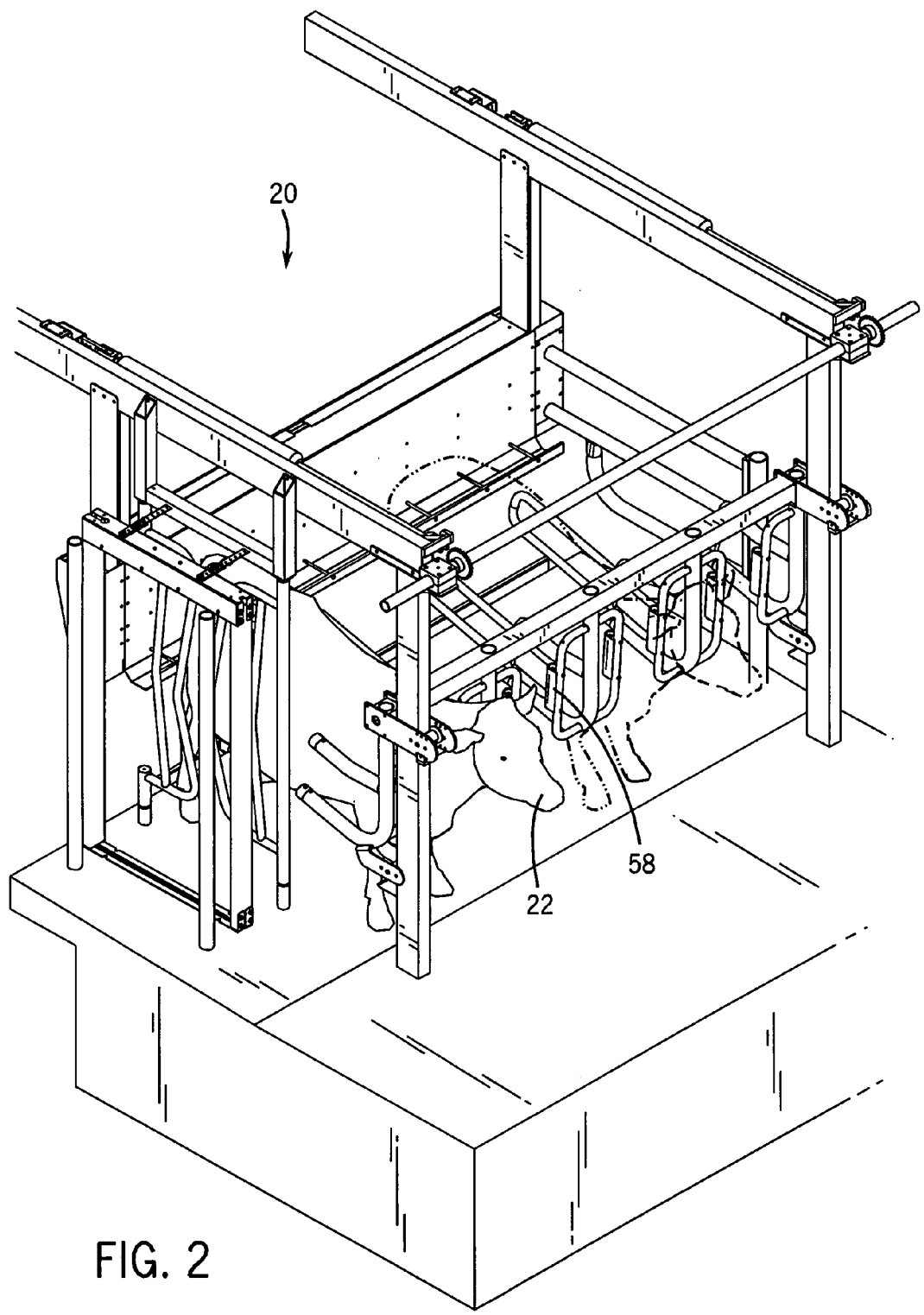
FIG. 2. is a perspective view of a milking parlor in accordance with the present invention.
Figure 3:
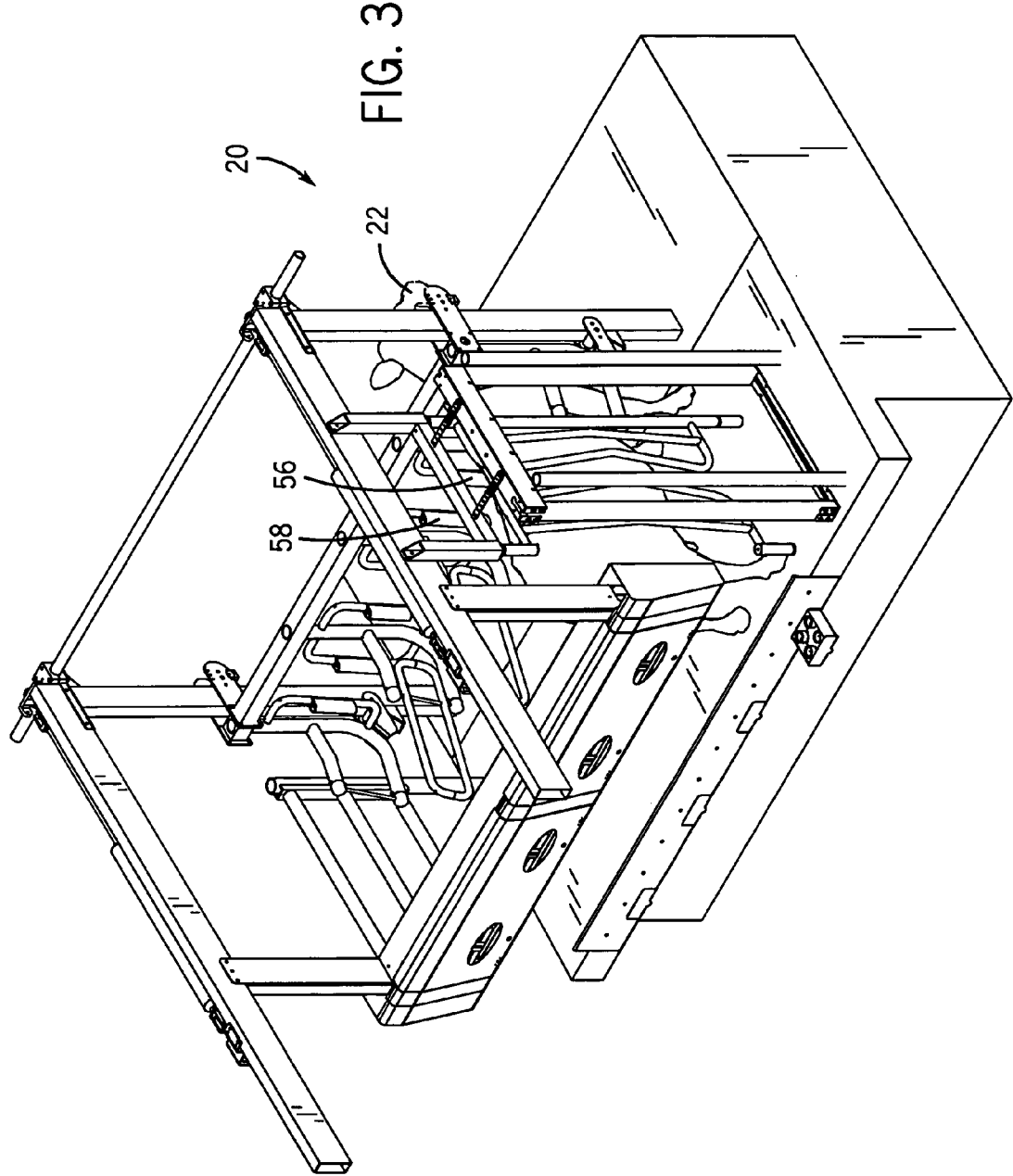
FIG. 3 is another perspective view of a milking parlor in accordance with the invention.
Figure 4:
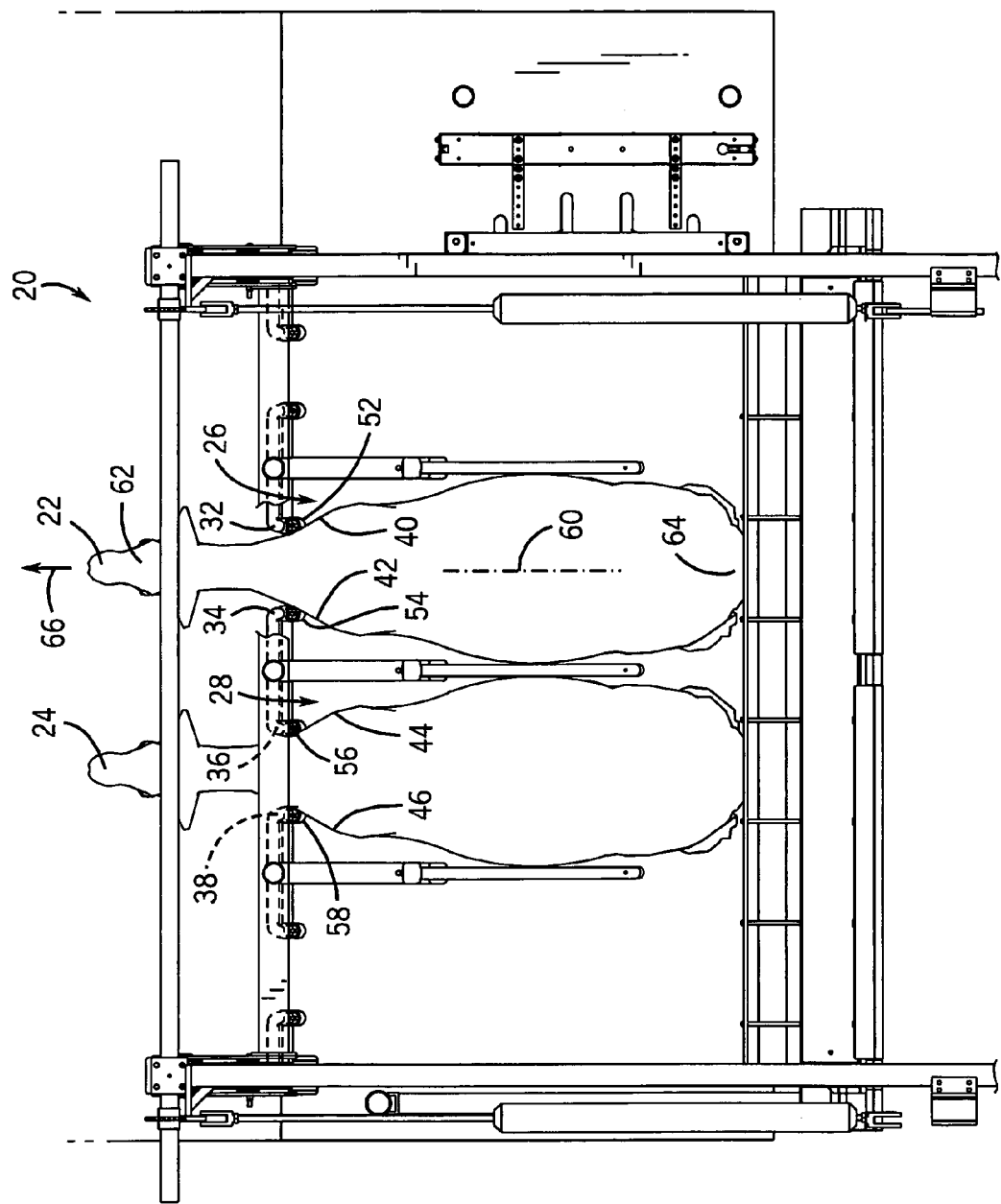
FIG. 4 is a top elevation view of milking stalls in accordance with the invention.
Figure 5:
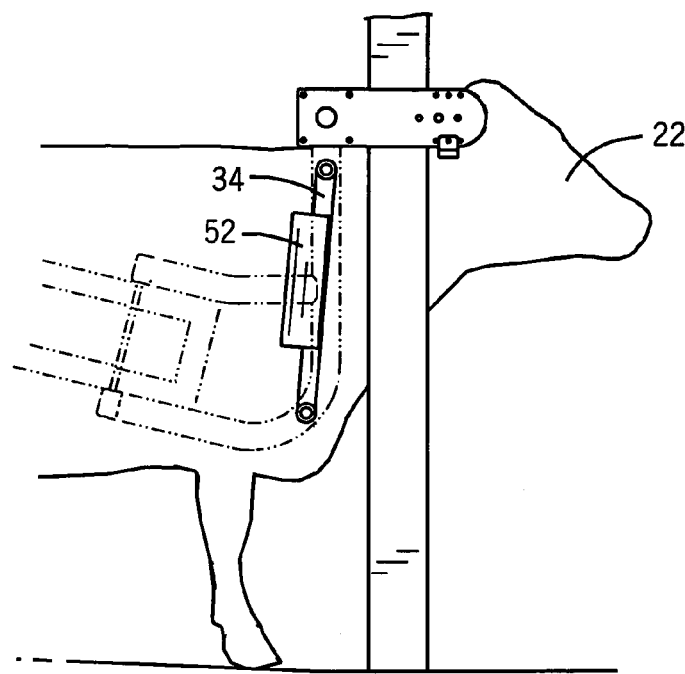
FIG. 5 is a side elevation view of a parlor stall of FIG. 4.

FIGS. 1–4 show a milking parlor 20 for milking a plurality of mammals such as cows 22, 24, etc. The parlor has a plurality of milking stalls 26, 28, etc. having respective shoulder bars, such as shoulder bars 32 and 34 for stall 26, and shoulder bars 36 and 38 for stall 28, for guidingly locating the shoulders of the respective cow in a milking position, for example shoulders 40 and 42 of cow 22, shoulders 44 and 46 of cow 24, etc. The milking parlor described thus far is known in the prior art, for example as shown in U.S. Pat. Nos. 5,203,280 and 6,481,371, incorporated herein by reference.

Figure 6:
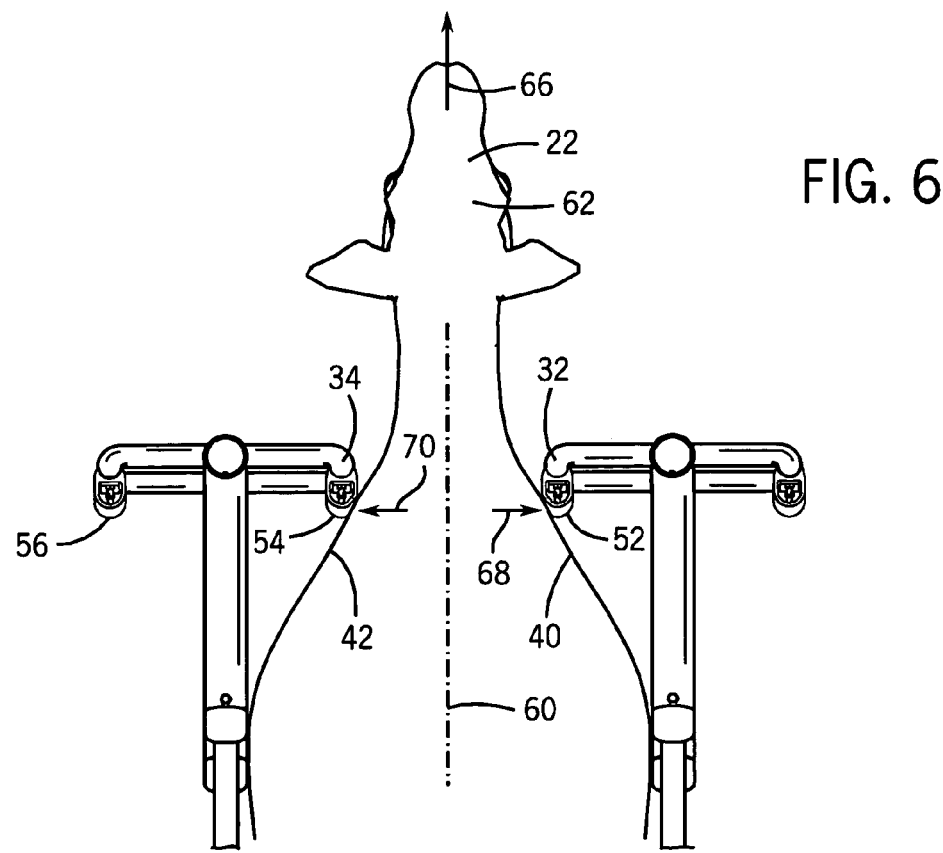
FIG. 6 is like FIG. 1 but shows the present invention.

In the present invention, the noted shoulder bars are provided with respective resilient bumpers such as 52, 54, 56, 58, etc. engaging the shoulders of the cows in deformable cushioning relation. A respective stall such as 26 aligns a respective cow such as 22 along a respective longitudinal axis 60 from head 62 to rump 64 of the cow and parallel to the backbone of the cow and bisecting the shoulders 40 and 42 on laterally opposite sides of axis 60. The bumpers are preferably a resilient rubber material and flex laterally outwardly away from axis 60 and also permit continued longitudinal movement of the cow along axis 60, e.g. as shown at arrow 66 in FIGS. 4, 6, during the noted lateral outward flexing of bumpers 52, 54, as shown at arrows 68 and 70 in FIG. 6, to accommodate different size cows including cows of differing longitudinal length. The laterally outward flexing of bumper 54 is shown in FIG. 11 at arrow 70 wherein the bumper moves from dashed line position 72 to solid line position 74. This allows slightly continued longitudinal movement of the cow along axis 60 as shown at arrow 66, to provide the noted accommodation of differing longitudinal length cows.

Figure 9:
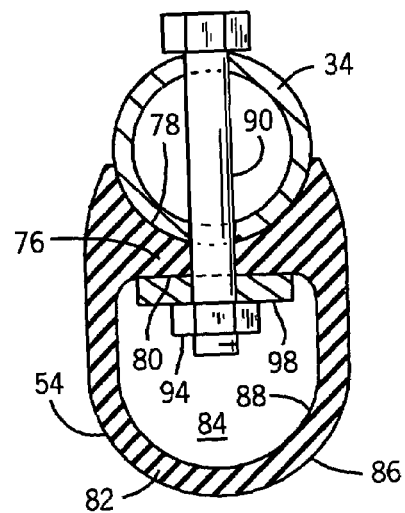
FIG. 9 is a sectional view taken along line 9—9 of FIG. 8.
Figure 8:
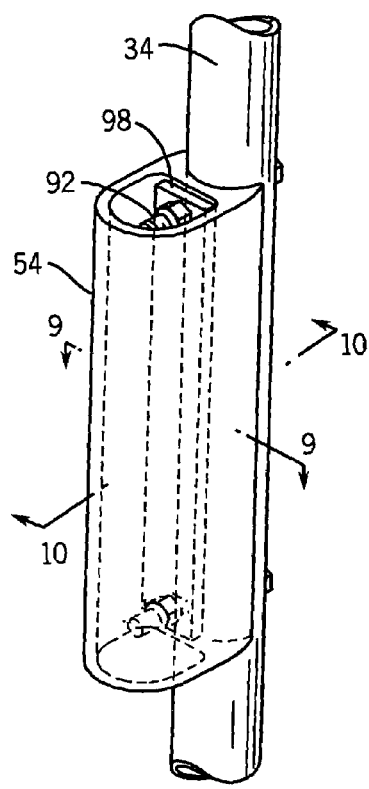
FIG. 8 is a perspective view of a portion of FIG. 7.

Each bumper, for example bumper 54 in FIGS. 8–11, has a first sidewall 76, FIG. 9, having an outer surface 78 engaging and mounted to a respective bar 34, and has an inner surface 80 opposite to outer surface 78. Bumper 54 has a second sidewall 82 extending in an arc from first sidewall 76 in a loop and returning to first sidewall 76 to define a hollow interior 84. Second sidewall 82 has an outer surface 86 engaging shoulder 42 of cow 22, and has an inner surface 88 opposite to outer surface 86 of sidewall 82 and facing inner surface 80 of sidewall 76 across hollow interior 84. Engagement of shoulder 42 of cow 22 with outer surface 86 of sidewall 82 deforms sidewall 82, FIG. 11, and pushes sidewall 82 into hollow interior 84 such that inner surface 88 of sidewall 82 moves toward inner surface 80 of sidewall 76.

Figure 10:
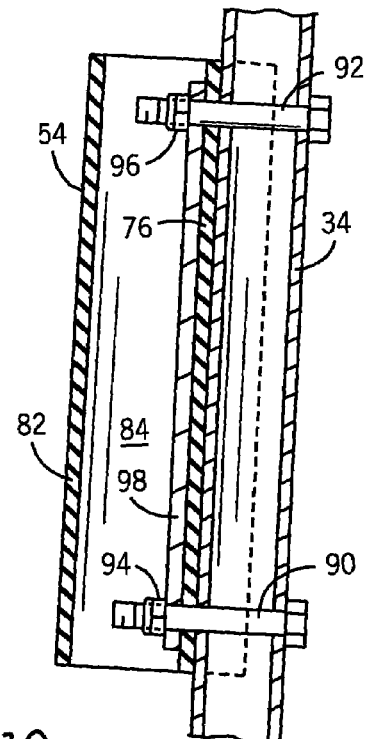
FIG. 10 is a sectional view taken along line 10—10 of FIG. 8.

Bolts 90, 92, FIGS. 9, 10 extend through bar 34 and through sidewall 76 and into hollow interior 84 for mounting bumper 54 to bar 34 by respective threaded nuts 94, 96. A stabilizing plate 98 in hollow interior 84 engages inner surface 80 of sidewall 76. Bolts 90, 92 extend through stabilizing plate 98.

Figure 7:
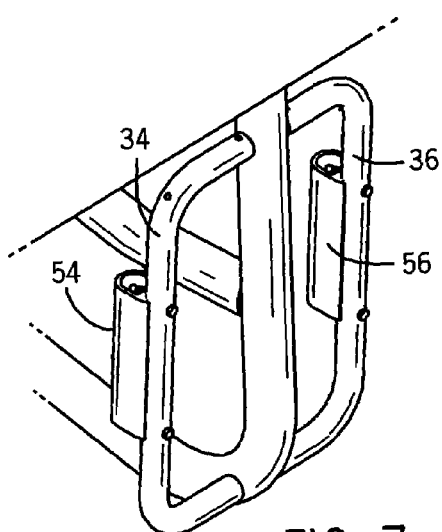
FIG. 7 is an isometric view of a portion of a milking parlor in accordance with the invention.

Hollow interior 84 of each bumper has a D-shape. Inner surface 80 of sidewall 76 forms the flat planar extension of the D. Inner surface 88 of sidewall 82 forms the curved arcuate extension of the D. Outer surface 78 of sidewall 76 has an arcuate configuration mating with tube 34 which is preferably cylindrical and has a circular cross section. Outer and inner surfaces 86 and 88 of sidewall 82 each have an arcuate configuration. Inner surface 80 of sidewall 76 has a flat planar configuration. Hollow interior 84 of the bumper provides limited collapse, FIGS. 11, 6, upon engagement by the respective shoulder of the cow. The bumper at outer surface 86 of sidewall 82 resiliently returns to a non-collapsed state, FIGS. 7–9, upon disengagement by the shoulder of the cow. The bumper has a resiliently flexible portion at 86 provided by the noted rubber material composition, deforming into hollow interior 84, FIG. 11, upon engagement by the shoulder of the cow, and resiliently returning to the non-collapsed state upon disengagement by the shoulder of the cow.

It is recognized that various equivalents, alternatives and modifications are possible within the scope of the appended claims.

What is claimed is:

1. A milking parlor for milking a plurality of mammals, comprising a plurality of stalls having respective shoulder bars guidingly locating the shoulders of the mammal in a milking position, said bars having respective resilient bumpers engaging said shoulders in deformable cushioning relation, wherein a respective said stall aligns a respective said mammal along a respective longitudinal axis from head to rump of the mammal and parallel to the backbone of the mammal and bisecting the shoulders of the mammal on laterally opposite sides of said axis, said bumpers flexing laterally outwardly away from said axis and also permitting continued longitudinal movement of the mammal along said axis during said lateral outward flexing, to accommodate different size mammals including mammals of differing longitudinal length, wherein each said bumper has a first sidewall having an outer arcuate surface engaging and mounted to a respective said bar, and an inner surface opposite to said outer surface, and a second sidewall extending in an arc from said first sidewall in a loop and returning to said first sidewall to define a hollow interior, said second sidewall having an outer surface engaging said shoulder of said mammal, and an inner surface opposite to said outer surface of said second sidewall and facing said inner surface of said first sidewall across said hollow interior, such that engagement of said shoulder of said mammal with said outer surface of said second sidewall deforms said second sidewall and pushes said second sidewall into said hollow interior such that said inner surface of said second sidewall moves toward said inner surface of said first sidewall.

2. The milking parlor according to claim 1 comprising a bolt extending through said bar and through said first sidewall and into said hollow interior for mounting said bumper to said bar.

3. The milking parlor according to claim 2 comprising a stabilizing plate in said hollow interior and engaging said inner surface of said first sidewall and through which said bolt extends for mounting said bumper to said bar.

4. The milking parlor according to claim 1 wherein said hollow interior has a D-shape, with said inner surface of said first sidewall forming the flat planar extension of the D, and with said inner surface of said second sidewall forming the curved arcuate extension of the D.

* * * * *